J. F. CULLIN.
FIELD COIL TESTING DEVICE.
APPLICATION FILED JAN. 26, 1920.
1,346,592.
Patented July 13, 1920.
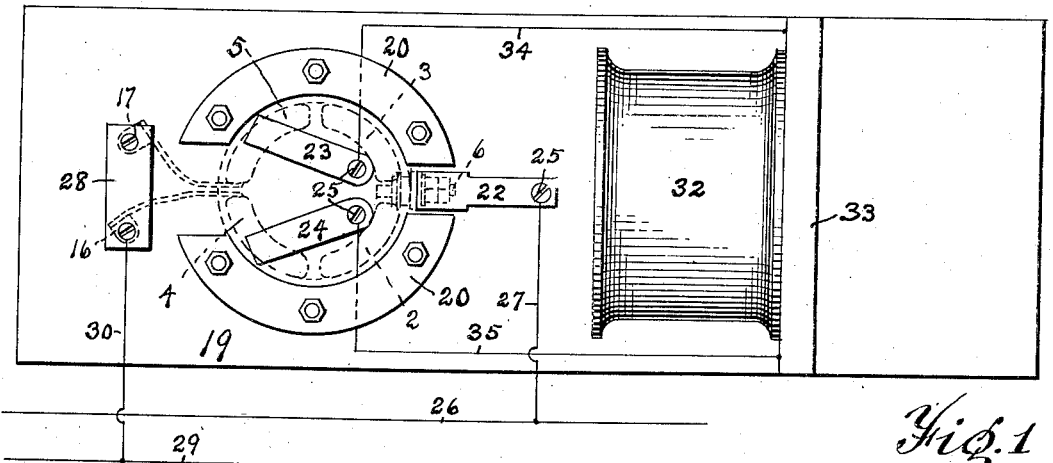
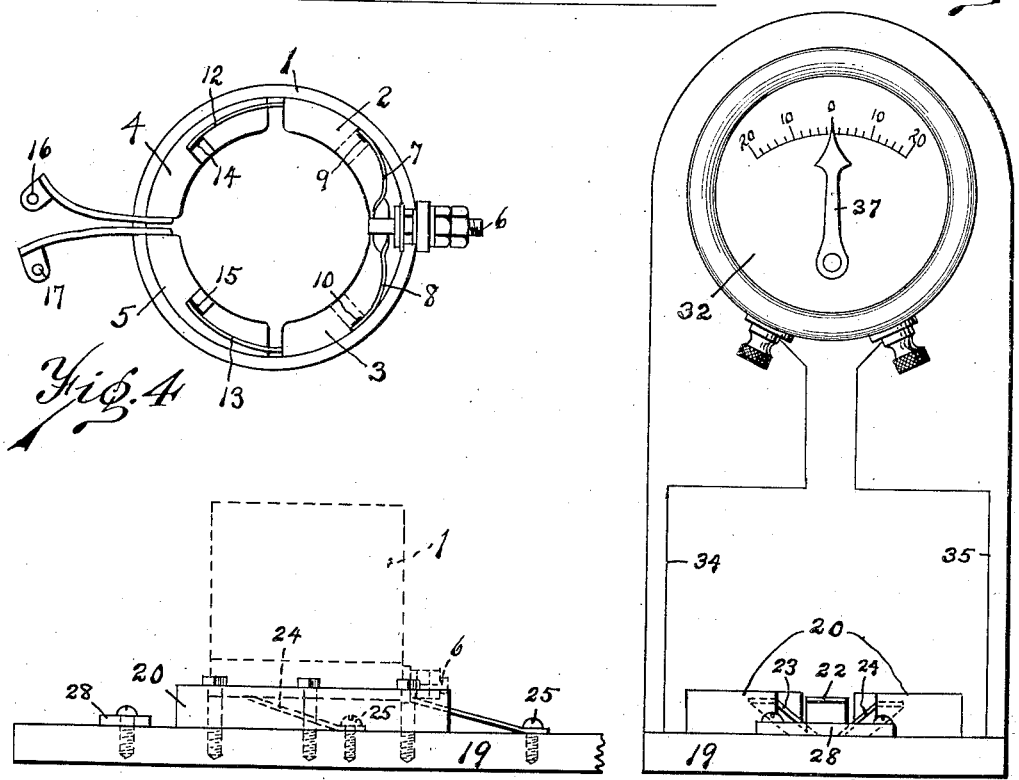
Inventor
Jasper F. Cullin
By Edward N. Pagelsen
Attorney

UNITED STATES PATENT OFFICE.

JASPER F. CULLIN, OF DETROIT, MICHIGAN, ASSIGNOR TO WILLIAM J. HARTWIG, OF DETROIT, MICHIGAN.

FIELD-COIL-TESTING DEVICE.

1,346,592.      Specification of Letters Patent.      Patented July 13, 1920.

Application filed January 26, 1920. Serial No. 353,912.

*To all whom it may concern:*

Be it known that I, JASPER F. CULLIN, a citizen of the United States, and residing at Detroit, in the county of Wayne and State of Michigan, have invented a new and Improved Field-Coil-Testing Device, of which the following is a specification.

This invention relates to means for determining the condition of the insulation of and connections between the field coils of electric motors and generators and consists in electric circuits and an electric balance to compare the resistances of pairs of coils, short circuiting of the coils reducing the resistance and poor soldering of the connections between coils increasing the resistances.

In the accompanying drawing, Figure 1 is a plan and Fig. 2 a front elevation of this field coil testing device. Fig. 3 is a side elevation of the holder and contacts. Fig. 4 is an end elevation of the field coils and the shell of the field.

Similar reference characters refer to like parts throughout the several views.

In Fig. 4, the cylindrical shell 1 of a motor or generator has coils 2, 3, 4 and 5 mounted on its inner side, the pole pieces not being shown. A binding post 6 is adapted to receive one end of a shunt circuit and from it two wires 7 and 8 lead to the coils 2 and 3, being soldered to the windings thereof at the points 9 and 10 respectively. The wires 12 and 13 of the windings of the coils 2 and 3 connect to the coils 4 and 5, being soldered thereto at the points 14 and 15 respectively. The windings of the coils 4 and 5 end at the terminals 16 and 17.

The testing device comprises a base 19 on which a pair of centering or guide blocks 20 are mounted. Inclined flat spring contacts 22, 23 and 24 may be secured to the base by means of screws 25, the contact 22 being connected to the line wire 26 by means of a short wire 27, while a fourth contact 28 is connected to another line wire 29 by means of a wire 30. The current in the line wires may be of any voltage and either direct or alternating so long as it is not dangerous and can be measured by means of a current indicator of any desired character, preferably the voltmeter 32, mounted conveniently near, a support 33 therefor being shown. Wires 34 and 35 extend from the current indicator to the contacts 23 and 24 respectively.

When the motor or dynamo shell 1 is inverted onto the contacts between the guide blocks 20, as indicated in Fig. 1, the post 6 will engage the contact 22, the two solder points 14 and 15 will engage the contacts 24 and 23 respectively, and the terminals 16 and 17 will rest on the contact plate 28. Current will now flow over wire 27, contact 22 and post 6 to the wires 7 and 8, coils 2 and 3, 4 and 5 to terminals 16 and 17, contact plate 28, wire 30 and line wire 29, and so long as the resistances in and between the windings are exactly equal and the soldering at the points 9, 10, 14 and 15 is sufficient, there will be no appreciable movement of the hand 37 of the current indicator 32.

But should the resistance at one side be greater than at the other, as for instance if there is a short circuit in the coil 4, then a portion of the current from the wire 13 will pass to the contact 23, wire 34 to the indicator 32, and wire 35, contact 24 to the solder point 14 and coil 4 to the contact plate 28. This will cause the hand 37 to swing from central position. Poor soldering at 15 will cause a similar movement of the hand. In fact, a short circuit in any one of the coils or poor soldering at any one of the points 9, 10, 14 and 15 will be indicated by the hand 37, unless exactly the same defect occurs in the coil or soldering on the opposite side, which is a most unusual occurance.

When the hand 37 swings either way to indicate faulty construction, the assembly is rejected and the poles and field coils are removed from the shell and carefully tested to locate the trouble. The present device is so constructed that one workman can easily test several hundred motor and dynamo field assemblies per hour, and as the percentage rejected is small, a machine of the present type which permits one man to test all the assembled field coils of a large factory is of great value as it places the responsibility for passing all the assembled field coils on one expert.

The details and proportions of the various parts of this testing device may all be changed by electrical engineers without departing from the spirit of my invention as set forth in the following claims.

I claim:—

1. A testing device for the field coils of electric machines comprising contacts and connections for passing a current through each of two groups of adjacent coils, a current indicator, and circuits and a pair of contacts to connect the indicator between the coils of each group.

2. A testing device for the field coils of four pole electric machines, which poles are arranged in two pairs, the coils of both pairs connecting to a central post and having terminals opposite said post, said device comprising means to connect the post and the terminals to the line wires of a current source, a current indicator having a pair of circuit wires, and contacts to connect each of the circuit wires of the indicator to a different pair of said field coils.

3. A testing device for the field coils of electric machines comprising two contacts and wires connecting said contacts to the line wires of a current source, a second pair of contacts arranged symmetrically and spaced apart between the first two contacts, and wires connecting the second pair of contacts to a current indicator.

4. A testing device for field coils of four pole electric machines of which two adjacent coils constitute one pair and the other two coils constitute a second pair, the coils of each pair being connected and the two pairs in turn being connected, said device comprising means for connecting one line wire of a current source to the point of connection of the two pairs of coils and for connecting the other line wire to the opposite ends of the windings of said pairs of coils, a current indicator, and a pair of circuit wires therefor, one of said circuit wires connecting to the point of connection between the coils of one pair and the other circuit wire connecting to the point of connection between the coils of the other pair of coils.

5. A testing device for the field coils of electric machines comprising two contacts and wires connecting said contacts to the line wires of a current source, a second pair of contacts arranged symmetrically and spaced apart between the first two contacts, wires connecting the second pair of contacts to a current indicator, one of the first two contacts and the second pair of contacts comprising inclined flat springs and the second of the first two contacts comprising a contact plate, and a base to which the contacts are secured.

JASPER F. CULLIN.